(12) United States Patent
Zhang et al.

(10) Patent No.: US 10,498,194 B2
(45) Date of Patent: Dec. 3, 2019

(54) HEAT DISSIPATING FAN HAVING A CENTRAL TUBE HAVING AN ANNULAR PLATE FORMING A STOPPING PORTION AND A BEARING UNIT HAVING A BEARING AND AN OIL SEAL COMPRISING A SINGLE MEMBER

(71) Applicants: CHAMP TECH OPTICAL (FOSHAN) CORPORATION, Foshan (CN); Foxconn Technology Co., Ltd., New Taipei (TW)

(72) Inventors: Yong-Kang Zhang, Foshan (CN); Yung-Ping Lin, New Taipei (TW)

(73) Assignee: CHAMP TECH OPTICAL (FOSHAN) CORPORATION, Foshan (CN)

( * ) Notice: Subject to any disclaimer, the term of this patent is extended or adjusted under 35 U.S.C. 154(b) by 350 days.

(21) Appl. No.: 15/485,414

(22) Filed: Apr. 12, 2017

(65) Prior Publication Data

US 2018/0231007 A1 Aug. 16, 2018

(30) Foreign Application Priority Data

Feb. 13, 2017 (CN) .......................... 2017 1 0075287

(51) Int. Cl.
*H02K 7/14* (2006.01)
*H02K 5/167* (2006.01)
*H02K 9/06* (2006.01)
*F04D 25/06* (2006.01)
*H02K 11/33* (2016.01)

(52) U.S. Cl.
CPC ............. *H02K 7/14* (2013.01); *F04D 25/062* (2013.01); *F04D 25/0626* (2013.01); *H02K 5/1675* (2013.01); *H02K 9/06* (2013.01); *H02K 11/33* (2016.01)

(58) Field of Classification Search
CPC .... F04D 25/062; F04D 29/051; F04D 29/626; F04D 25/0626; F04D 19/002; F04D 29/056; H02K 7/14; H02K 9/06; H02K 5/1675; H02K 11/33; F16C 21/00; F16C 2360/46; F16C 17/026; F16C 2370/00; F16C 17/02–107; F16C 33/104
USPC ..... 417/354, 423.12, 423.14, 423.7; 384/481
See application file for complete search history.

(56) References Cited

U.S. PATENT DOCUMENTS

| | | | |
|---|---|---|---|
| 5,610,462 A * | 3/1997 | Takahashi ............ | H02K 5/1675 310/90 |
| 6,271,612 B1 * | 8/2001 | Tanaka .................. | F16C 17/026 310/90 |
| 8,742,638 B1 * | 6/2014 | Sodeoka ............... | F16C 17/107 310/90 |

(Continued)

FOREIGN PATENT DOCUMENTS

CN 201277259 Y 7/2009
CN 202309304 U 7/2012

*Primary Examiner* — Devon C Kramer
*Assistant Examiner* — Benjamin Doyle
(74) *Attorney, Agent, or Firm* — ScienBiziP, P.C.

(57) ABSTRACT

A heat dissipating fan includes a base with a central tube, a stator arranged on the base and around the central tube, a rotor connected to and rotated surround the stator and a bearing unit received in the central tube of the base. The bearing unit includes a bearing and an oil seal, where the bearing and an oil seal are molded as one.

16 Claims, 2 Drawing Sheets

(56) References Cited

U.S. PATENT DOCUMENTS

| | | | | |
|---|---|---|---|---|
| 9,035,516 B2* | 5/2015 | Heo | .................... | H02K 5/1675 |
| | | | | 310/90 |
| 2004/0264817 A1* | 12/2004 | Satoji | .................... | F16C 17/026 |
| | | | | 384/100 |
| 2005/0163404 A1* | 7/2005 | Shishido | ............... | F16C 17/026 |
| | | | | 384/100 |
| 2007/0267928 A1* | 11/2007 | Yeh | ........................ | H02K 7/085 |
| | | | | 310/90 |
| 2009/0022611 A1* | 1/2009 | Bei | ....................... | F04D 29/626 |
| | | | | 417/423.12 |
| 2009/0072643 A1* | 3/2009 | Yazawa | ................ | F04D 29/057 |
| | | | | 310/90 |
| 2009/0232678 A1* | 9/2009 | Yang | .................... | F04D 29/051 |
| | | | | 417/410.1 |
| 2010/0172758 A1* | 7/2010 | Yang | .................... | F04D 25/062 |
| | | | | 415/230 |
| 2012/0194010 A1* | 8/2012 | Horng | ................... | H02K 1/187 |
| | | | | 310/43 |
| 2012/0235526 A1* | 9/2012 | Wu | ....................... | H02K 5/1675 |
| | | | | 310/90 |
| 2014/0369839 A1* | 12/2014 | Tamaoka | ............. | F04D 29/057 |
| | | | | 416/174 |
| 2017/0343042 A1* | 11/2017 | Kato | ....................... | F16C 43/02 |

\* cited by examiner

HEAT DISSIPATING FAN HAVING A CENTRAL TUBE HAVING AN ANNULAR PLATE FORMING A STOPPING PORTION AND A BEARING UNIT HAVING A BEARING AND AN OIL SEAL COMPRISING A SINGLE MEMBER

FIELD

The subject matter herein generally relates to a heat dissipating fan.

BACKGROUND

With the continuing development of electronics technology, electronic packages such as CPUs (central processing units) employed in electronic devices are generating more and more heat. The heat requires immediate dissipation in order for the CPU and the electronic device to continue to operate stably. A heat dissipating fan is commonly used in combination with a heat sink for cooling the CPU.

A conventional heat dissipating fan needs oil during operation. However, preventing oil leakage is problematic.

BRIEF DESCRIPTION OF THE DRAWINGS

Implementations of the present technology will now be described, by way of example only, with reference to the attached figures.

DETAILED DESCRIPTION

Figure 1:
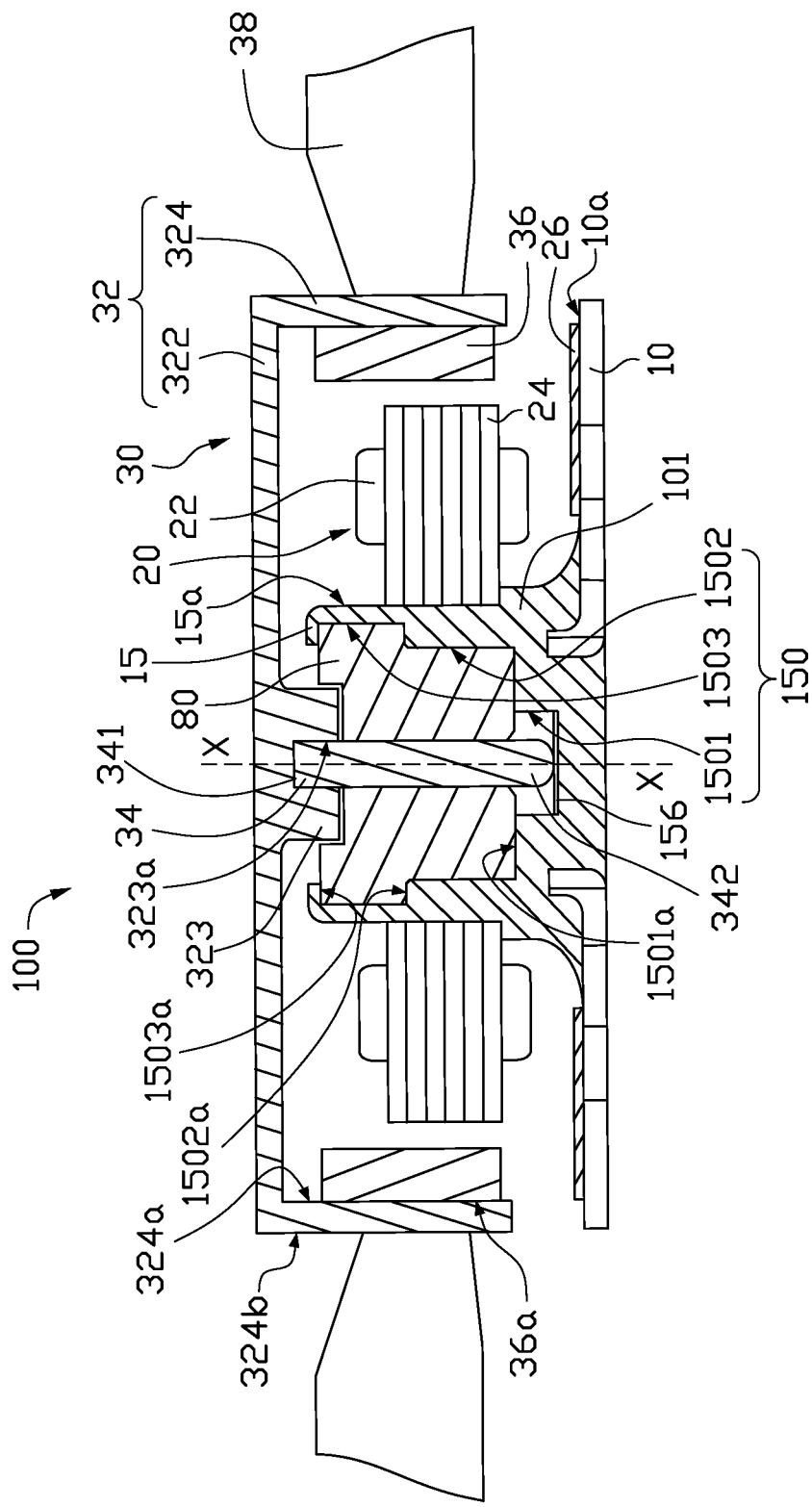
FIG. 1 is a cross section view showing a heat dissipating fan according to an exemplary embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

Referring to FIG. 1, this disclosure provides a heat dissipating fan 100. The heat dissipating fan 100 can be used in an electrical device having a heat-generating component. The electrical device can be a computer or a server. The heat-generating component can be a CPU. The heat dissipating fan 100 can be used for dispersing heat energy generated by the heat-generating component.

The heat dissipating fan 100 comprises a base 10, a stator 20, a rotor 30 and a bearing unit 80. The stator 20 is arranged on the base 10. The rotor 30 is connected to and rotates around the stator 20. The bearing unit 80 is received in the base 10.

The base 10 can be a plate. A central tube 15 can be formed at a center of the base 10 extending upward from the center of the base 10. The central tube 15 is a hollow cylinder. A receiving hole 150 with an open top end can be defined in the central tube 15. The receiving hole 150 extends along an axial direction X-X of the central tube 15 for receiving the bearing unit 80.

The receiving hole 150 defines a first receiving portion 1501, a second receiving portion 1502, and a third receiving portion 1503. The first receiving portion 1501, the second receiving portion 1502, and the third receiving portion 1503 are arranged along the axial direction X-X of the central tube 15 and extend upwards away from the base 10. An inner diameter of the first receiving portion 1501 is less than an inner diameter of the second receiving portion 1502. A first supporting portion 1501a is defined on the first receiving portion 1501. The inner diameter of the second receiving portion 1502 is less than an inner diameter of the third receiving portion 1503. A second supporting portion 1502a is defined on the second receiving portion 1502. A gasket 156 is positioned on the base 10 and is received in the first receiving portion 1503.

An annular plate 155 is formed on the central tube 15 and extends from the top end of the central tube 15 to the axial direction X-X. An inner diameter of the annular plate 155 is less than the inner diameter of the third receiving portion 1503. A stopping portion 1503a is defined under the annular plate 155.

The stator 20 can comprise a stator core 22, a coil 24 and a printed circuit board 26.

The stator 20 is a ring. The stator 20 is arranged around the central tube 15. A circular boss 101 is defined on an outer surface 15a of the central tube 15. The circular boss 101 is formed on a corner between the outer surface 15a of the central tube 15 and a top surface 10a of the base 10. The stator 20 is arranged on the circular boss 101. An external diameter of the circular boss 101 is larger than an external diameter of the central tube 15 and larger than an inner diameter of the stator 20.

The stator core 22 is positioned outside of the outer surface 15a of the central tube 15 and around the central tube 15. The coil 24 is wound around the stator core 22. The printed circuit board 26 is arranged on the top surface 10a of the base 10. The coil 24 is electrically connected to the printed circuit board 26.

The rotor 30 can comprise a hub 32, a shaft 34, a magnet ring 36, and a plurality of blades 38.

The hub 32 comprises a top wall 322 and a side wall 324 extending perpendicularly downward from a periphery of the top wall 322. The top wall 322 has a seat 323. The seat 323 is formed at a center of the top wall 322 and extends perpendicularly downward from the center of the top wall 322. A receiving recess 323a is defined in the seat 323 and comprises a bottom open end.

The shaft 34 can be a cylinder. The shaft 34 has a top end 341 and a bottom end 342 formed opposite to the top end 341.

The magnet ring 36 can be fastened and connected to the side wall 324 of the hub 32. An outer surface 36a of the magnet ring 36 is positioned at and attached to an inner surface 324a of the side wall 324.

The blades 38 are positioned around an outer surface 324b of the side wall 324 and extend outward from the outer surface 324b of the side wall 324.

Figure 2:
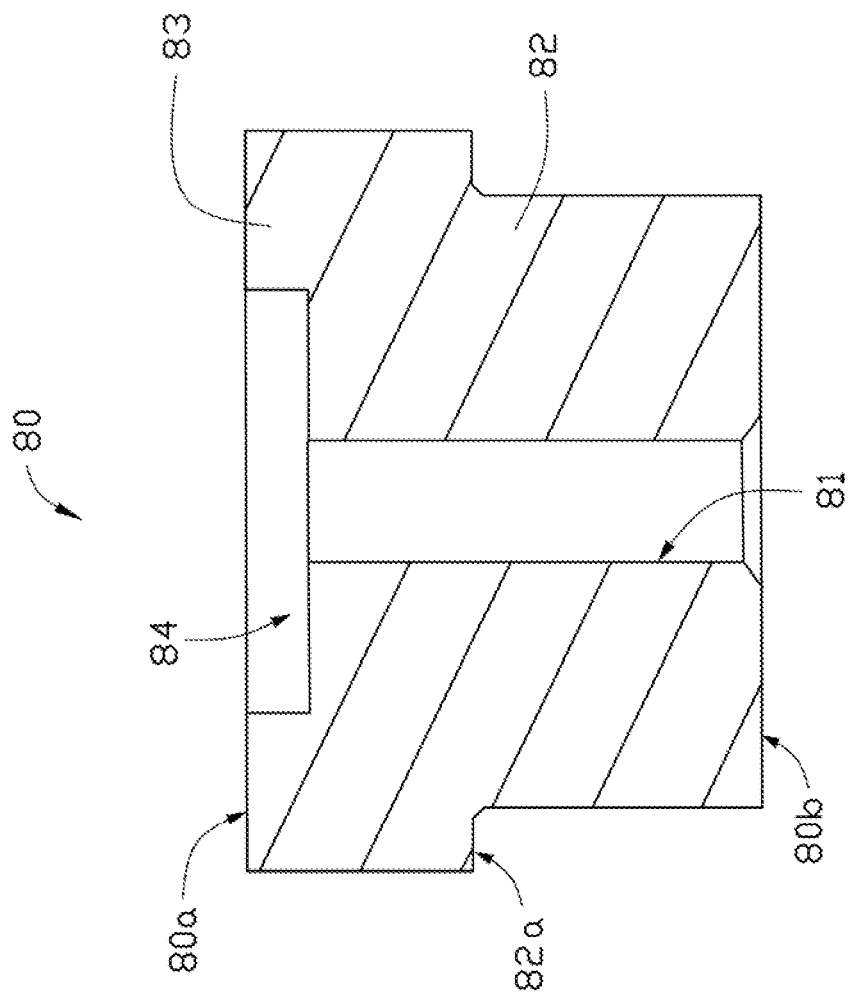
FIG. 2 is a cross section view showing a bearing unit of a heat dissipating fan according to an exemplary embodiment of the present disclosure.

Referring to FIG. 2, the bearing unit 80 is received in the receiving hole 150. The bearing unit 80 roughly is a cylinder with a receiving channel 81 from a top surface 80a to a bottom surface 80b. The bearing unit 80 can be made of metal or plastic.

The bearing unit 80 defines a bearing 82 and an oil seal 83. The bearing 81 and the oil seal 82 can be molded as one. An external diameter of the bearing 82 is less than an external diameter of the oil seal 83. An abutting portion 82a is defined under the oil seal 83.

The bearing unit 80 further has a receiving concave 84. The receiving concave 84 is defined from the top surface 80a of the bearing unit 80 to the bottom surface 80b of the bearing unit 80.

In assembly, the bearing unit 80 is received in the receiving hole 150 of the central tube 15. The bottom surface 80b of the bearing unit 80 abuts on the first supporting portion 1501a of the first receiving portion 1501 of the central tube 15. The abutting portion 82a of the bearing unit 80 abuts on the second supporting portion 1502a of the second receiving portion 1502 of the central tube 15. The top surface 80a of the bearing unit 80 abuts under the stopping portion 1503a of the annular plate 155 of the central tube 15. The oil seal 83 of the bearing unit 80 is positioned between the second supporting portion 1502a of the second receiving portion 1502 of the central tube 15 and the stopping portion 1503a of the annular plate 155 of the central tube 15. The top end of the oil seal 83 can be fastened with the annular plate 155 by a hot melt method for receiving the bearing unit 80 in the receiving hole 150.

The shaft 34 is received in the receiving channel 81 and passes through the receiving channel 81. The top end 341 and the bottom end 342 of the shaft 34 are exposed out of the top surface 80a and the bottom surface 80b of the bearing unit 80. The bottom end 342 is received in the first receiving portion 1503 and attached to the gasket 156. The top end 341 is received and fastened in the receiving recess 323a of the seat 323. The seat 323 is received and stretches into the receiving concave 84 of the bearing unit 80.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A heat dissipating fan comprising:
a base having a central tube, the central tube formed at a center of the base and extending upward from the center of the base, the central tube defining a receiving hole extending along an axial direction of the central tube, the receiving hole defining a first receiving portion, a second receiving portion, and a third receiving portion arranged along the axial direction of the central tube and extending upward from the base, an inner diameter of the first receiving portion being less than an inner diameter of the second receiving portion, a first supporting portion defined on the first receiving portion, the inner diameter of the second receiving portion being less than an inner diameter of the third receiving portion, a second supporting portion being defined on the second receiving portion, an annular plate formed on the central tube and extending from a top end of the central tube in the axial direction, an inner diameter of the annular plate being less than the inner diameter of the third receiving portion, a stopping portion defined under the annular plate;
a stator arranged on the base and around the central tube;
a rotor rotatably connected to the stator; and
a bearing unit received in the central tube of the base, the bearing unit defining a bearing and an oil seal, the bearing and the oil seal comprise a single member, an external diameter of the bearing being less than an external diameter of the oil seal, an abutting portion defined under the oil seal, and the oil seal of the bearing unit positioned between the second supporting portion of the second receiving portion of the central tube and the stopping portion of the annular plate of the central tube.

2. The heat dissipating fan of claim 1, wherein a circular boss is defined on an outer surface of the central tube, and the circular boss is formed on a corner between the outer surface of the central tube and a top surface of the base.

3. The heat dissipating fan of claim 2, wherein the stator is arranged on the circular boss.

4. The heat dissipating fan of claim 2, wherein an external diameter of the circular boss is larger than an external diameter of the central tube, and larger than an inner diameter of the stator.

5. The heat dissipating fan of claim 1, wherein the stator comprises a stator core and a coil, the stator core is positioned outside of the outer surface of the central tube and around the central tube, and the coil is wound around the stator core.

6. The heat dissipating fan of claim 1, wherein the rotor comprises a hub and a shaft.

7. The heat dissipating fan of claim 6, wherein the hub comprises a top wall and a side wall extending perpendicularly downward from a periphery of the top wall, the top wall has a seat, and the seat is formed at a center of the top wall and extends perpendicularly downward from the center of the top wall.

8. The heat dissipating fan of claim 7, wherein the bearing unit has a receiving concave, and the receiving concave is defined from the top surface of the bearing unit to the bottom surface of the bearing unit.

9. The heat dissipating fan of claim 8, wherein the seat is received in and stretches into the receiving concave of the bearing unit.

10. The heat dissipating fan of claim 7, wherein a receiving recess is defined in the seat and has a bottom open end.

11. The heat dissipating fan of claim 10, wherein the shaft has a top end and a bottom end formed opposite to the top end, the top end is received and fastened in the receiving recess of the seat, and the bottom end is received in the first receiving portion.

12. The heat dissipating fan of claim 6, wherein the bearing unit has a receiving channel from a top surface to a bottom surface, the shaft is received in the receiving channel and passes through the receiving channel, and the top end and the bottom end of the shaft are exposed out of the top surface and the bottom surface of the bearing unit.

13. The heat dissipating fan of claim 1, wherein the bottom surface of the bearing unit abuts on the first supporting portion of the first receiving portion of the central tube.

14. The heat dissipating fan of claim 1, wherein the abutting portion of the bearing unit abuts on the second supporting portion of the second receiving portion of the central tube.

15. The heat dissipating fan of claim 1, wherein the top surface of the bearing unit abuts under the stopping portion of the annular plate of the central tube.

16. The heat dissipating fan of claim 1, wherein the fan further comprises a gasket positioned on the base and received in the first receiving portion.

\* \* \* \* \*